United States Patent [19]

Huignard et al.

[11] Patent Number: 4,505,536
[45] Date of Patent: Mar. 19, 1985

[54] OPTICAL DEVICE FOR REAL-TIME AMPLIFICATION OF THE RADIANT ENERGY OF A BEAM

[75] Inventors: Jean-Pierre Huignard; Abdellatif Marrakchi El Fellah, both of Paris, France

[73] Assignee: Thomson-CSF, Paris, France

[21] Appl. No.: 354,049

[22] Filed: Mar. 2, 1982

[30] Foreign Application Priority Data

Mar. 13, 1981 [FR] France .................. 81 05135

[51] Int. Cl.³ ............................ G03H 1/02
[52] U.S. Cl. ................................... 350/3.64
[58] Field of Search ............ 350/3.62, 3.63, 3.64, 350/3.67

[56] References Cited

U.S. PATENT DOCUMENTS 4,138,189  2/1979  Huignard et al. .............. 350/3.64

FOREIGN PATENT DOCUMENTS 2362466  8/1976  France .

OTHER PUBLICATIONS

Marhov et al., *Dynamic Holography* . . . , Optics and Laser Technology, vol. 11, No. 2, Apr. 1979, pp. 95–99.
Staebler et al., *Coupled Wave Analysis* . . . , Journal of Applied Physics, vol. 43, No. 3, Mar. 1972, pp. 1042–1049.
Su et al., *Refractive Index Profile* . . . , Applied Optics, vol. 15, No. 8, Aug. 1976, pp. 1947–1952.
Feinberg et al., *Photorefractive Effects* . . . , Journal of Applied Physics, vol. 51, No. 3, Mar. 1980, pp. 1297–1305.

*Primary Examiner*—Bruce Y. Arnold
*Assistant Examiner*—William Propp
*Attorney, Agent, or Firm*—Cushman, Darby & Cushman

[57] ABSTRACT

An object beam and a reference beam incident on a photosensitive recording material interfere with each other to form a refractive-index strata grating. An energy transfer takes place between the reference beam and the object beam in the presence of a transverse electric field applied to the terminals of the material. A displacement of the interference fringes within the medium permits operation under optimum energy transfer conditions.

14 Claims, 10 Drawing Figures

OPTICAL DEVICE FOR REAL-TIME AMPLIFICATION OF THE RADIANT ENERGY OF A BEAM

This invention relates to an optical device for real-time amplification of the radiant energy of a beam.

This type of amplification can be performed by interposing an optical device on the path of the beam considered. One known practice involves the use of an optical device consisting of a recording medium in which interference takes place between the beam considered and a second beam or so-called reference beam. By way of example, said recording medium can be a photosensitive electrooptical material such as bismuth silicon oxide (BSO).

In materials of this type, a fringe pattern formed by interference between the wavefront reflected from the object and the reference wavefront produces, in real time with due allowance for the time of recording in the material, a refractive-index strata grating structure constituting a hologram which is characteristic of the object wavefront. The strata grating structure diffracts part of the energy of the incident reference wavefront in a diffracted wave whose wavefront is isomorphous with the object wavefront. By adopting these principles in order to make use of wave-coupling phenomena in photosensitive recording media of substantial thickness such as the single crystal BSO, an appreciable energy transfer from the reference beam to the object beam can be achieved after they have passed through said crystal. The intensity of the directly-transmitted object beam is increased in practice by a factor of 2 to 3 in the presence of the reference beam which, under these conditions, acts as a pumping wave. However, recording by zero-field scattering alone satisfies optimum conditions for this wave-coupling system. These conditions are no longer satisfied when applying an electric field which makes it possible to induce a high refractive-index variation.

The invention relates to these wave-coupling techniques in materials which permit recording of dynamic holograms by variation of the photoinduced refractive index. The device which is proposed ensures that energy transfer from the reference wave to the object wave takes place under optimum conditions in the presence of a transverse field applied to the material considered. These conditions are fulfilled by introducing a displacement of interference fringes. Accordingly, the device under consideration permits coherent amplification of the radiant energy of a beam.

The invention is therefore directed to an optical device for real-time amplfication of the radiant energy of a beam, comprising a photosensitive recording material in which a grating structure of photoinduced refractive-index strata is recorded in real time. Said strata grating structure is obtained by interference within the mass of said material between an incident object beam emanating from a coherent source and a reference beam which is coherent with said object beam. A transfer of energy takes place between said reference beam and said object beam, an electric field at right angles to the plane of the strata being applied to the terminals of said material. In said device, mechanical means are provided so as to permit a displacement of said photosensitive material during the time of recording in the material, the phase shift between the refractive-index strata grating structure and the pattern of interference fringes of these two beams being thus maintained constant and equal to $\pi/2$.

Other features of the invention will be more apparent on consideration of the following description and accompanying drawings, wherein.

The device proposed herein is based on dynamic holographic recording on a photosensitive medium which operates on the principle of a photoinduced variation in refractive index. The operation is illustrated diagrammatically in FIG. 1. The signal wavefront $\Sigma_o$ diffracted by the object interferes in a coherent manner with a plane wave designated by the reference $\Sigma_R$. The pattern of interference fringes is recorded in real time in the material in the form of a photoinduced variation in refractive index. Physically, wave coupling results in energy transfer from the reference beam to the signal wave after they have passed through the crystal. The intensity of the object beam is therefore increased in the presence of the reference beam which acts as a pumping wave under these conditions.

On the front face of the interaction medium, the degree of fringe modulation resulting from interference of these two beams is of small magnitude:

$$m \simeq 2\sqrt{\frac{I_o}{I_R}} \text{ with } I_o << I_R$$

where $I_o$ and $I_R$ are the light intensities of the beams.

Since the interaction medium is dynamic, the reference wave diffracted by the phase grating generates a wave $\Sigma_d$ which is identical with the signal wave.

Said wave $\Sigma_d$ is in phase with the incident object wave $\Sigma_o$ if the refractive-index pattern is phase-shifted by $\psi = \pi/2$ with respect to the spatial light-intensity modulation produced by the interference fringes. Under these conditions, the degree of fringe modulation increases after the beams have passed through the interaction medium. In accordance with this process, the material behaves as a recording medium having a nonlinear characteristic and an appreciable transfer of energy from the reference beam to the object beam can be obtained.

Figure 1:
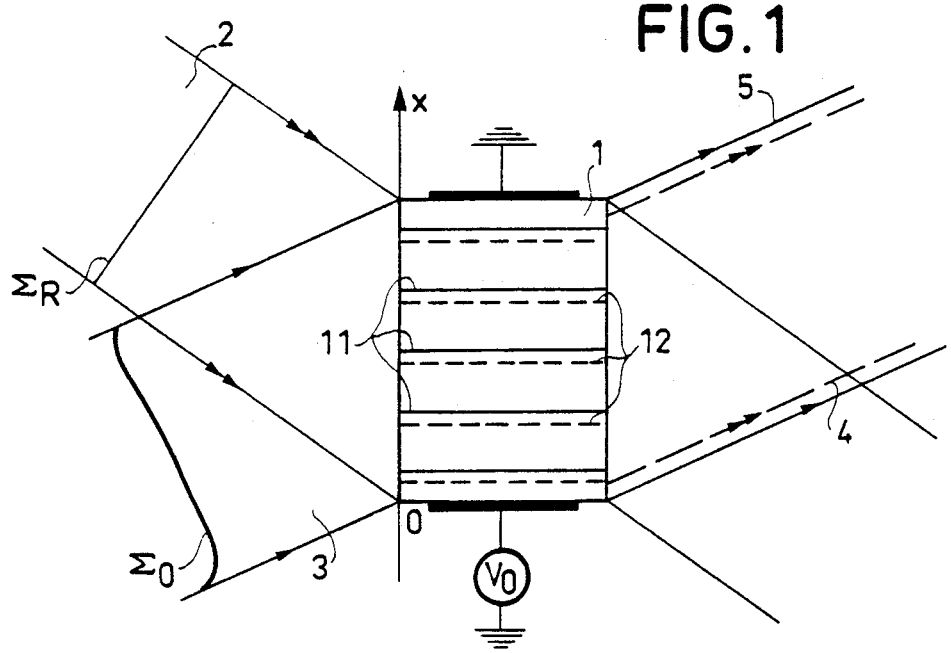
FIGS. 1 to 4 are explanatory diagrams.

As shown in FIG. 1, a single crystal 1 of substantial thickness which has been cut from photoconductive material such as BSO, for example, is placed on the path of the object wave 2 having a wavefront $\Sigma_o$. Within the thickness of the crystal, said object wave interferes with a reference wave 3 having a plane wavefront $\Sigma_R$.

After a recording interval $\tau$, the pattern 11 of interference fringes thus formed generates in real time a refractive-index strata grating structure 12 within the crystal. This strata grating structure or pattern diffracts part of the energy of the reference wave 3 in a diffracted wave 4, the wavefront of which is isomorphous with the object wavefront $\Sigma_o$.

Figure 2:
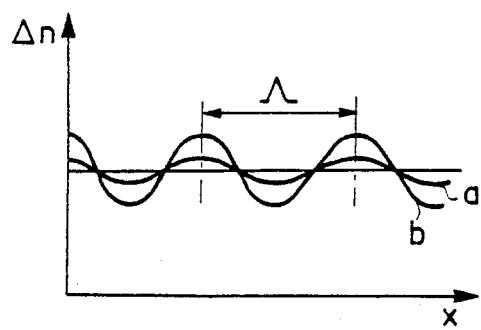

Now in the case of the single crystal BSO and of other like photosensitive electrooptical crystals, the photoinduced grating structure can be phase-shifted exactly by $\pi/2$ with respect to the incident illumination pattern. In consequence, the diffracted wave 4 thus obtained is strictly superimposed on the transmitted wave 5. The general effect thereby achieved is the same as if the transmitted object wave had been enriched with a fraction of the energy of the reference wave. If the crystal in which interference of the two beams takes place is of substantial thickness (namely of the order of 1 cm), the transmitted object beam can be considerably intensified by a factor of 2 to 3. In fact, on the front face of the crystal, the interference of the two beams is the underlying cause of intensification of the object beam in accordance with the process hereinabove described. It is true that the object beam intensification is very slight when taking into account the very small degree of fringe modulation as shown at a in FIG. 2 since the ratio of object and reference beam intensities is in practice of the order of $10^{-3}$ to $10^{-4}$ on said entrance face.

As it propagates within the crystal, said intensified object wave again interferes with the reference beam, thus increasing the degree of modulation of the fringes and giving rise to a slightly larger additional supply of energy to the object beam and so on in succession throughout the thickness of the crystal in which the object and reference beams interfere with each other. The reason for this process lies in the fact that the novel photoinduced grating structure is always in phase with the principal pattern by reason of the phase shift of $\pi/2$ between the interference pattern and the refractive-index grating structure. On the exit face, the degree of modulation of the fringes is greater than on the entrance face, as shown at b in FIG. 2.

Thus, if the length of interaction within the medium is sufficient, it is possible to obtain an appreciable increase in the intensity of the emergent object beam, namely by a factor of 2 to 3 under practical operating conditions.

Figure 3:
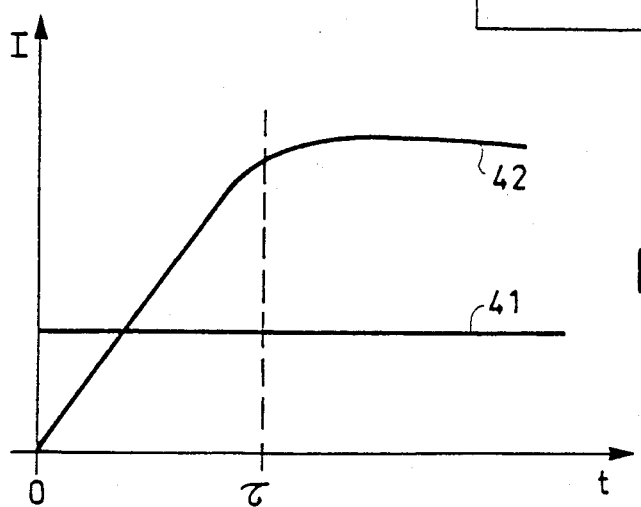

This increase in intensity of the transmitted beam as a result of wave coupling within a crystal of substantial thickness is shown in the diagram of FIG. 3, in which the intensity is represented as a function of time. In this diagram, the straight line 41 represents the intensity of the directly-transmitted object beam in the absence of the reference beam 3. This intensity is constant from the instant of time 0 at which the incident object beam arrives on the crystal BSO.

Curve 42 shows the formation of the diffracted object beam at the end of the time interval $\tau$ in the case of the present invention, with an intensity which is two to three times greater than that of the directly-transmitted object beam. The energy of said diffracted beam is collected from the reference beam.

The crystal 1 may or may not be subjected to a transverse electric field in the direction of the axis O-X in FIG. 1. The phase shift of $\pi/2$ between the interference pattern and the refractive-index grating is established automatically but the effectiveness of the amplification phenomenon is greater as the applied electric field is of higher value, typically between 10 and 20 kV.cm$^{-1}$. This saturation recording of the refractive-index grating structure by means of the interference fringe pattern is not instantaneous and requires a predetermined length of time $\tau$, typically 100 ms, and the same applies to erasure of the pattern, or grating structure.

The practical application of the energy-transfer phenomena within a BSO crystal entails the need for a crystal orientation such that the field is applied in the direction [001] and that the fringes are perpendicular to the mean direction of the field:

$$I(x) = I_0(1 + m \cos Kx)$$

where m is the degree of modulation.

Figure 4:
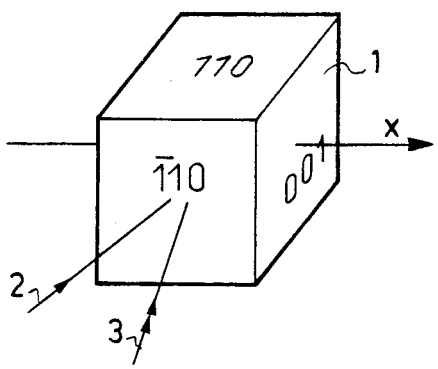

Thus the preferential orientation of the single crystal with respect to the direction of the electric field which is the x-axis is the orientation shown in FIG. 4, that is to say, perpendicular to the faces of the form 001 of the crystal. The angle of incidence of the beams on the faces of the form {110} or {1$\overline{1}$0}, which determines the pitch of the fringes, is optimum in the vicinity of 20° to 30°. By way of example, said angles of incidence can be $+20°$ in the case of the object beam and $-20°$ in the case of the reference beam. The time constants $\tau$ required for the transfer of energy from the reference beam to the object beam are practically independent of the ratio of intensities of the incident beams, namely the reference and object beams, and $\tau$ varies from 50 to 100 ms when said ratio varies from 1 to 1000. The coefficient of amplification obtained in the case of the transmitted object beam is also independent of said intensity ratio as soon as this latter is higher than 10 and is a nonlinear function of the electric field applied to the crystal when said field exceeds a threshold value of 10 kV.cm$^{-1}$. Furthermore, it is technologically difficult to operate at values above 20 kV.cm$^{-1}$.

There are two modes for recording the variation in photoinduced refractive index.

One recording mode consists of zero-field "scattering": $E_o = 0$; $\Lambda \simeq 0.5$ to 1 $\mu$m.

In this case, the amplitude of the photoinduced refractive-index modulation $\Delta n_a$ is small but proportional to the gradient of the illumination $$\Delta n_a \propto \frac{dI}{dx}$$

The other mode consists of recording by "drift" under an applied field $E_o \simeq 6$ kV.cm$^{-1}$; $\Lambda \simeq 3$ $\mu$m.

Said field is applied perpendicularly to the plane of the refractive-index strata. In this case, the amplitude of the refractive-index variation $\Delta n_b$ is high and practically in phase with the illumination $$n_b \propto I(x); \Delta n_b \gg \Delta n_a$$

The only mode of recording which satisfies optimum conditions in the case of the wave coupling $\Omega = \pm \pi/2$ is the method of zero-field scattering $E_o = 0$. However, the energy transfers obtained experimentally remain limited since the variation in photoinduced refractive index is small.

The device according to the invention makes it possible to utilize the high refractive-index variation caused by recording in an applied field by introducing a suitable displacement of the interference fringes during the time of recording in the material.

The above-mentioned displacement of the material results in a phase shift of the photoinduced pattern (grating structure) with respect to the incident illumination. At a suitable rate of displacement, said phase shift can be adjusted to the optimum value $\Omega = +\pi/2$. Under these conditions, it is established experimentally that a large energy transfer takes place from the reference wave to the signal wave after passing through the crystal. Amplification of the incident image has been obtained in the case of applied-field values exceeding 6 kV.cm$^{-1}$ with a strata pitch of $\Lambda \simeq 3$ μm.

The incident illumination corresponding to interference of the two beams 2 and 3 is a signal of the form $$I(x,t) = I_0(1 + m \cos kx)$$

where m is the degree of modulation and $\overline{k}$ is the wave vector such that $$k = \frac{2\pi}{\Lambda}.$$

$\Lambda$ being the pitch of the strata.

If we consider a material having a non-local response, as is the case with an electrooptical medium subjected to an electric field, we have:

$$\Delta n = \Delta n_o \cos(Kx + \phi')$$

where $\Delta n$ is the refractive-index variation within the medium.

The ideal solution as defined earlier would be to have $\phi' = \pi/2$ and therefore $\Delta n = \Delta n_o \sin kx$ but this is not possible in the case under consideration. In the presence of an electric field, optimum coupling of the waves within the medium no longer takes place, thereby entailing the need for displacement of the strata: let V be the rate of displacement of said strata; if $\tau$ is the time of recording of the strata, we have the following time response: $\Delta n = \Delta n_s (1 - e^{-t/\tau})$.

Figure 5:
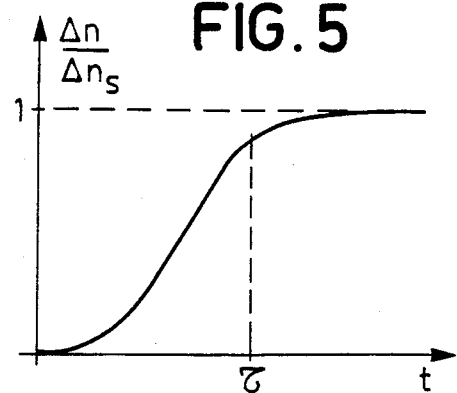
FIG. 5 represents an explanatory curve of refractive-index variations after illumination by a fringe pattern.

This response is illustrated in FIG. 5, where $\Delta n_s$ is the value of $\Delta n$ at saturation.

At the time of this displacement of the strata, we have:

$$I(x,t) = I_0[1 + m \cos(k(x - vt))]$$

with m: degree of modulation $$\Delta n \propto I(x,t)$$

we have $\Delta n(x,t)$ which is a pulsed response $$\Delta n(x,t) = I(x,t) \otimes \delta(t)$$

where x represents a convolution
where $\delta(t)$ is the response of the material $$\Delta n = \Delta n_s \int_0^t m \cos k(x - vt') e^{-\frac{(t-t')}{\tau}} dt'$$

$$\Delta n = m \Delta n_s \cos \phi \cos[k(x - vt) + \phi]$$

with $tg\phi = kv\tau$.

where $\tau$ is the time-delay involved in establishing $\Delta n$ as shown in FIG. 5.

$\Delta n$ can be split up into $\Delta n_1$ and $\Delta n_2$; $\Delta n_1$ being in phase with the illumination and $\Delta n_2$ being in quadrature with said illumination.

$$\Delta n_1 = m \Delta n_s \cos \phi \cos \phi \cos k(x - vt)$$

$$\Delta n_2 = m \Delta n_s \cos \phi \sin \phi \sin k(x - vt)$$

$\Delta n_2$ is the component which permits a wave coupling such as to produce an optimum energy transfer.

$\Delta n_2$ is of maximum value in respect of $\phi = \pi/4$
Thus, $$tg\phi = 1 = kv\tau$$

$$\Delta n_2 = m \frac{\Delta n_s k v \tau}{1 + k^2 v^2 \tau^2} \sin k(x - vt)$$

Thus, $\Delta n_2 = \frac{m \Delta n_s}{2} \sin k (x - vt)$

Figure 6:
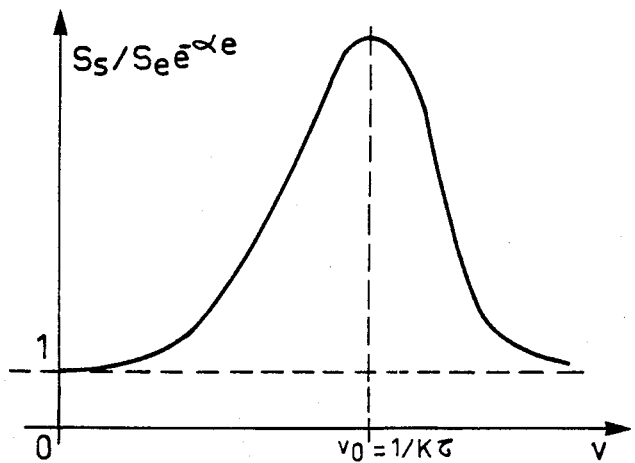
FIG. 6 represents an explanatory curve of the refractive-index variation in respect of a given rate of displacement of fringes.

We have a curve of the form illustrated in FIG. 6. This curve passes through a maximum value in respect of $$V_o = \frac{\Lambda}{2\pi\tau}$$

We then have an amplification such that:

$$S_s = S_e e^{(\Gamma - \alpha)e}$$

where $S_s$ is the output signal, $S_e$ is the input signal, $\alpha$ represents the absorption losses and $\Gamma$ represents the amplification, e being the length of interaction within the crystal $$\Gamma = \frac{4\pi \Delta n_2}{\lambda \cos \theta},$$

where $\theta$ is the half-angle between the incident recording beams with the medium; in respect of $kv\tau = 1$, we have $\Gamma$ optimum.

Figure 7:
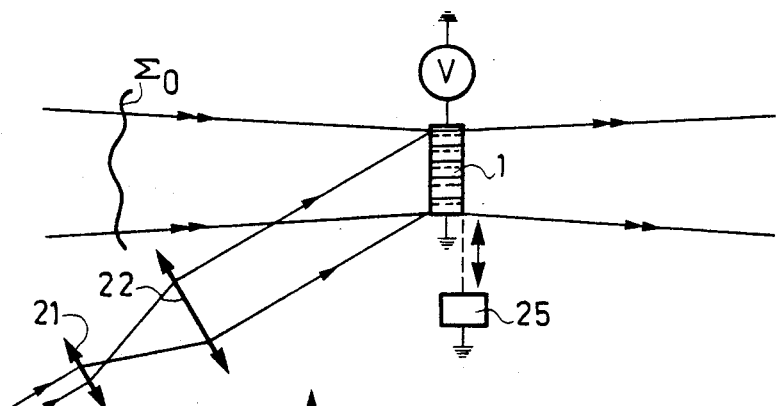
FIG. 7 is a diagram of the optical device according to the invention.
Figure 8:
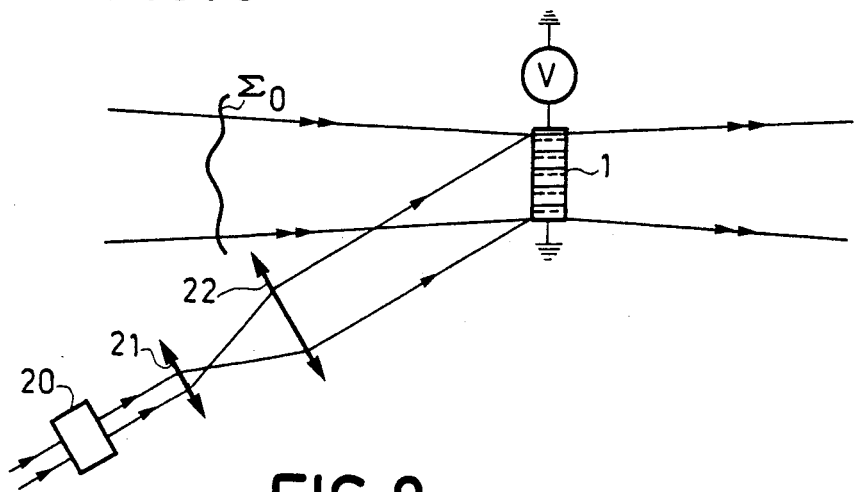
FIGS. 8 and 9 are alternative embodiments of said device.

In order to carry out the aforesaid displacement of strata, the medium 1 can be displaced at the velocity v by means of a motor 25 during the time $\tau$ of recording in the medium as shown in FIG. 7. This displacement of the material may be dispensed with, however, by placing a phase modulator 20 on the path of the reference wave as shown in FIG. 8. This modulator ensures a displacement of the fringes at a velocity v such that $$v\tau = \frac{\Lambda}{2\pi}.$$

Figure 9:
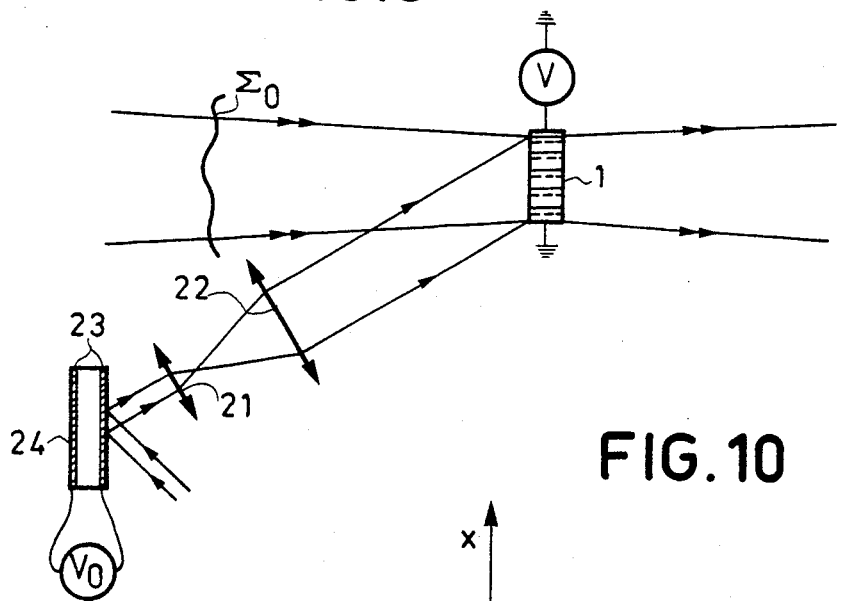
Figure 10:
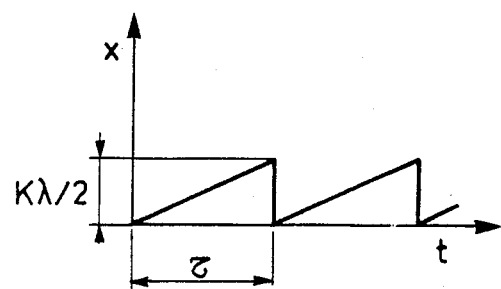
FIG. 10 represents the curve of displacement of the piezoelectric mirror shown in FIG. 9.

Said phase shift can be carried out by means of a mirror associated with a piezoelectric transducer, for example, or by means of an acoustooptical device according to the speeds required. One practical form of execution of said phase shift with a mirror 24 associated with a piezoelectric transducer is illustrated in FIG. 9. In the case of a sequential operation, provision is made for a control signal $V_o$ having a sawtooth waveform as illustrated in FIG. 10. By way of example, said mirror 24 is fabricated from piezoelectric material in the form of a film, one face of which is metallized. One of the control electrodes 23 may in fact be employed for this purpose as shown in FIG. 9.

The sawtooth signal serves to produce a displacement of the strata which appears to be constant. The amplitude of said signal must permit a displacement of a whole number of fringes. The curve of FIG. 10 represents the displacement of the mirror. If $\lambda$ is the wavelength of the reflected beam and one displacement of the mirror is amplified by two at the level of the beam, the phase shift represented by said signal is therefore equal to k(λ/2).

Thus, if the displacement velocity v is such that $$v\tau = \frac{\Lambda}{2\pi},$$

optimum conditions are accordingly achieved in regard to energy transfer. Consideration can be given, for example, to the following values:

$$\tau \simeq 1 \text{ ms}, \Lambda = 3 \ \mu\text{m}.$$

Thus, $$v = \frac{\Lambda}{2\pi \ \tau} \simeq 500 \ \mu\text{m/s}.$$

In the case of an applied field $E_o = 10$ kV cm$^{-1}$, the gain $\Gamma$ obtained is $\Gamma = 2.4$ cm$^{-1}$ namely: $S_s$:1.5 $S_e$ in respect of $\alpha = 1.9$ cm$^{-1}$.

The device described earlier may be applied to other types of materials having much shorter time constants than those obtained with a crystal of BSO. For example in the case of semiconductor materials, it is possible to obtain $\tau = 10^{-9}$ sec. A rapid displacement of the interference fringes is readily obtained with an acoustooptical device. This device operates at a frequency $F = 1/(2\pi\tau)$, for example; with $\tau = 10^{-9}$ s, $F \simeq 200$ MHz.

In this case a phenomenon of acoustooptical drift is utilized for continuous operation, the acoustooptical material being controlled by a signal having a frequency F. Since the incident signal has a frequency fo, the signal which emerges has a frequency $fr = fo + F$: the refractive indices o and r relate respectively to the incident beam and to the deviated beam and the capital letter relates to the acoustic wave. In fact the propagation of an acoustic wave within a refracting medium is represented in regard to the optical index of said medium by a synchronous wave disturbance whose origin lies in the modulation applied to the local density of material by the local distribution of pressures.

From an optical standpoint, a phase grating formed in this acoustooptical material and having a pitch equal to $\Lambda_F = V_F/F$ and therefore the same as $$v_F\tau_F = \frac{\Lambda_F}{2\pi} \cdot F = \frac{1}{2\pi\tau_F}$$

accordingly corresponds to a traveling wave having a frequency F.

We may consider:

$$\Lambda_F = 3 \ \mu\text{m}, \ \tau_F = 1 \text{ ns} \ V_F = 0.5 \times 10^9 \ \mu\text{m/s}$$

and $$F \simeq 200 \text{ MHz}.$$

The phase modulator or the acoustooptical device may just as readily be placed on the incident object beam and not on the reference beam.

What is claimed is:

1. An optical device for real-time amplification of the radiant energy of a beam, comprising
   a photosensitive recording material having terminals and in which a grating structure of photoinduced refractive-index strata is recorded in real time, said strata grating structure being obtained by interference within the mass of said material between an incident object beam emanating from a coherent source and a reference beam which is coherent with said object beam, a transfer of energy being carried out between said reference beam and said object beam,
   means for applying an electric field, at right angles to the plane of the strata, to the terminals of said material, and
   mechanical means for displacement of said photosensitive material during the time of recording in the material, the phase shift between the refractive-index strata grating structure and the pattern of interference fringes of these two beams being thus maintained constant and equal to $\pi/2$.

2. A device according to claim 1, wherein the mechanical means comprises a motor.

3. A device according to claim 1, wherein the rate of displacement of the photosensitive material is equal to $\Lambda/(2\pi\tau)$, where $\Lambda$ is the pitch of the strata and $\tau$ is the time of recording in the medium.

4. A device according to claim 1, wherein the photosensitive recording material is an electrooptical material.

5. A device according to claim 4, wherein the recording material is a single crystal of bismuth silicon oxide.

6. A device according to claim 5, wherein the electric field is applied in the direction [001] of the single crystal, the beams being incident upon the faces of the form {110} or {1̄10}.

7. An optical device for real-time amplification of the radiant energy of a beam, comprising
   a photosensitive recording material having terminals and in which a grating structure of photoinduced refractive-index strata is recorded in real time, said strata grating structure being obtained by interference within the mass of said material between an incident object beam emanating from a coherent source and a reference beam which is coherent with said object beam, a transfer of energy being carried out between said reference beam and said object beam,
   means for applying an electric field, at right angles to the plane of the strata, to the terminals of said material, and
   phase-modulating means placed in the path of one of the two beams so as to cause a displacement of the strata during the time of recording in the material, the phase shift between the refractive-index strata grating structure and the pattern of interference fringes of these two beams being thus maintained constant and equal to $\pi/2$.

8. A device according to claim 7, wherein the phase-modulating means comprises a mirror associated with a piezoelectric transducer.

9. A device according to claim 8, wherein the curve of displacement of the mirror as a function of time has a sawtooth wave profile.

10. A device according to claim 9, wherein said sawtooth wave has a period $\tau$ and a phase-shift amplitude of k λ/2, where λ is the wavelength of the beam on whose path the mirror is placed, where k is a whole number higher than or equal to 1, and where $\tau$ is the time of writing in the material.

11. A device according to claim 10, wherein the rate of displacement of the mirror is equal to $\Lambda/(2\pi\tau)$, where $\Lambda$ is the pitch of the strata and where $\tau$ is the time of writing in the medium.

12. A device according to claim 7, wherein the phase-modulating means comprises an acoustooptical device.

13. A system for real-time amplification of the radiant energy of a beam, comprising:
coherent source means for emanating an object beam;
reference source means for emanating a reference beam coherent with said object beam;
a photosensitive recording medium for recording a strata grating structure of photo-induced refractive-index strata during a time $\tau$, said object beam and said reference beam both being incident on said recording medium, said recorded grating structure being obtained from a pattern of interference between said object beam and said reference beam within said recording medium, said medium including terminals;
means, connected to said terminals, for producing an electric field within said recording medium at right angles to the plane of the strata of said grating structure; and
displacing means for displacing said recording medium at a rate of $\Lambda/(2\pi\tau)$, where $\Lambda$ is the pitch of the strata of said grating structure, during recording time $\tau$ to produce a constant phase shift of $\pi/2$ between said refractive-index strata grating structure and said interference pattern, said displacing means including a mechanical device,
wherein said recording medium transfers energy between said reference beam and said object beam.

14. A system for real-time amplification of the radiant energy of a beam, comprising:
coherent source means for emanating an object beam;
reference source means for emanating a reference beam coherent with said object beam;
a photosensitive recording medium for recording a strata grating structure of photo-induced refractive-index strata during a time $\tau$, said object and said source beams both being incident on said recording medium, said recorded grating structure being obtained from a pattern of interference between said object beam and said reference beam within said recording medium, said medium including terminals;
means, connected to said terminals, for producing an electric field within said recording medium at right angles to the plane of the strata of said grating structure; and
displacing means for displacing said recording medium at a rate of $\Lambda/(2\pi\tau)$, where $\Lambda$ is the pitch of the strata of said grating structure, during recording time $\tau$ to produce a constant phase shift of $\pi/2$ between said refractive-index strata grating structure and said interference pattern wherein said displacing means includes phase-modulating means operatively coupled to one of said coherent source means and said reference source means, for modulating the phase of one of said object and reference beams with respect to the other,
wherein said recording medium transfers energy between said reference beam and said object beam.

* * * * *